US012124433B2

(12) United States Patent
Xiao et al.

(10) Patent No.: US 12,124,433 B2
(45) Date of Patent: Oct. 22, 2024

(54) GRAPHIC-BLOCKCHAIN-ORIENTATED HYBRID CONSENSUS IMPLEMENTATION APPARATUS AND IMPLEMENTATION METHOD THEREOF

(71) Applicant: Huazhong University of Science and Technology, Wuhan (CN)

(72) Inventors: Jiang Xiao, Wuhan (CN); Shuohua Dong, Wuhan (CN); Jingtao Yue, Wuhan (CN); Xiaohai Dai, Wuhan (CN); Jian Chang, Wuhan (CN); Shijie Zhang, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 59 days.

(21) Appl. No.: 17/806,668

(22) Filed: Jun. 13, 2022

(65) Prior Publication Data

US 2023/0017790 A1    Jan. 19, 2023

(30) Foreign Application Priority Data

Jul. 13, 2021    (CN) .......................... 202110792744.1

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS

2019/0130114 A1* 5/2019 Smith ................... H04L 9/0637
2019/0244306 A1* 8/2019 Kursun ................. G06F 16/137
(Continued)

FOREIGN PATENT DOCUMENTS

| CN | 111080288 A | * | 4/2020 | ......... G06F 16/2246 |
| CN | 112202775 | | 1/2021 | |
| CN | 112685793 A | * | 4/2021 | |

OTHER PUBLICATIONS

Bitcoin: A Peer to Peer Electronic Cash System; www.bitcoin.org: 2008, Satoshi Nakamoto.

*Primary Examiner* — Augustine K. Obisesan
(74) *Attorney, Agent, or Firm* — Michael Ye; Kalos Athena Wang PLLC (57) ABSTRACT

The present invention relates to an implementation method for graphic-blockchain-orientated hybrid consensus, at least comprising: calling at least one module to generate a new data block and broadcast it; calling at least one module to check and validate the received new block based on predetermined rules; calling at least one module to generate a void block; and calling at least one module to update a committee member list. The existing graphic blockchain can only achieve probabilistic consensus, yet the present invention achieves deterministic consensus on graphic blockchain for the first time, thereby reaching consensus faster. The present invention decouples generation and consensus of blocks for the first time, so that the two parts can be designed separately in a modularized manner. The present invention provides the first totally decentralized hybrid consensus algorithm in the graphic blockchain. This is unachievable to many existing graphic blockchain such as IOTA and Obyte.

12 Claims, 3 Drawing Sheets

(56) References Cited

U.S. PATENT DOCUMENTS

| | | | |
|---|---|---|---|
| 2020/0092085 A1* | 3/2020 | Baek | H04L 9/3265 |
| 2022/0027970 A1* | 1/2022 | Kim | G06Q 30/0613 |
| 2022/0044228 A1* | 2/2022 | Nishida | G06F 16/27 |
| 2022/0327503 A1* | 10/2022 | Zhao | G06Q 20/065 |

* cited by examiner

GRAPHIC-BLOCKCHAIN-ORIENTATED HYBRID CONSENSUS IMPLEMENTATION APPARATUS AND IMPLEMENTATION METHOD THEREOF

This application claims the benefit of the Chinese Patent Application No. 202110792744.1 filed on Jul. 13, 2021, which is hereby incorporated by reference as if fully set forth herein.

BACKGROUND OF THE INVENTION

1. Technical Field

The present invention relates to the technical field of computer applications, and more particularly to a graphic-blockchain-orientated hybrid consensus implementation apparatus and an implementation method thereof.

2. Description of Related Art

In 2008, a scholar under the pseudonym "Satoshi Nakamoto" published a paper titled "Bitcoin: A Peer-to-Peer Electronic Cash System" on the Internet, and subsequently disclosed Bitcoin technology, so that the first blockchain system was implemented, which laid the foundation for the subsequent research and development of blockchain technology. In a narrow sense, blockchain is a special distributed database which has a chain-like data structure composed of blocks, each of which is formed by multiple organized pieces of data, in a sequential manner. Herein, tamper-proofing and unforgeability of blockchain can be guaranteed in a cryptographic way. Broadly speaking, the blockchain technology is a new distributed infrastructure and computing paradigm that uses distributed consensus algorithms and cryptography to realize trusted distributed ledgers.

In any blockchain system, a set of distributed participants needs to reach consensus on certain values, so the blockchain consensus algorithm is the core of all blockchain systems. The working principle of the blockchain is as follows: the system periodically elects a leader from all the participants in the blockchain by some method, and the leader collects the data that needs to be stored into the blockchain from the client, organizes single or multiple pieces of data into a certain data structure, namely a block, then the leader broadcasts the block information to other participants, and each participant can independently decide to accept or reject it. All blocks form a blockchain in a sequential manner, and rely on cryptographic means to ensure the tamper-proofing and unforgeability of blockchain.

There are two main types of blockchain consensus algorithms. The first one is competition-based consensus algorithm, wherein in each round of master node selection, a competition success standard will be set as a certain resource, and the consensus node that first reaches the standard becomes the master node. All blockchain participants compete with each other based on a certain resource, wherein the resources controlled by the participants are proportional to the probability of winning the competition. At regular intervals, one of the participants will win and gain the power to propose a block. For example, in the PoW consensus algorithm, all nodes participating in the consensus compete to become the master node by consuming computing power to solve mathematical problems, and the node that first solves the mathematical problems becomes the master node. The second one is election consensus algorithm. Herein, all nodes vote for selection, wherein according to the voting results, some consensus algorithms generate a set of master nodes, and these nodes become the master node in turn, and the other consensus algorithms only generate one master node responsible for creating blocks. In the next round, a revoting will be launched. All blockchain participants can reach a consensus on the new block by voting. The election-based consensus process includes: 1. selecting a set of trusted nodes, and these trusted nodes take turns to be the master node; 2. verifying blocks, indeed in two ways, one way is similar to the competition algorithm, wherein the master node broadcasts the block to the other nodes for verification, and the other way is that the master node's block is verified through three rounds of BFT (Byzantine Fault-Tolerant) voting process; 3. having the node submit the verified block, and reaching a consensus state. Election-based consensus algorithms include, for example, DPoS (Delegate Proof of Stake), PBFT (Practical Byzantine Fault Tolerance), DBFT (Delegated Byzantine Fault Tolerance), and so on. The first type of algorithm can advantageously be applied to unlicensed, large-scale scenarios, but the consensus efficiency is low; the second type of algorithm has the merit of high consensus efficiency, but it's not applicable in unlicensed, large-scale scenarios.

In recent years, blockchain has been widely used in such fields as smart contracts, financial transactions, e-commerce, Internet of Things and international trade. However, blockchain has also exposed the shortcomings of low performance, especially in aspect of weak processing capabilities and slow processing speed. One of the main reasons for the low performance of the blockchain is the low efficiency of the current blockchain consensus algorithms. Therefore, designing a high-performance blockchain consensus algorithm is of great significance to improve the performance of the blockchain system. Recently, in order to improve the performance of blockchain, academia and industry have proposed a new architecture called graphic blockchain, which is mainly characterized in that each block in the blockchain can have multiple parent blocks, while in a traditional blockchain, each block can only have one parent block. In other words, participants in a traditional blockchain can only reach consensus on one chain, but in a graphic blockchain, participants reach consensus on the entire direct acyclic graph (DAG).

Since a block DAG has a network-structured underlying layer, when implementing consensus, it can meet more challenges than a link-like structure. To address these challenges, in the prior art, for example, China Patent Publication No. CN112202775B provides a consensus mechanism for a blockchain of a directed acyclic graph structure, which converts the consensus-related problem in a block DAG into a consensus-related problem in a blockchain, and uses the mature consensus mechanism in the blockchain technology to solve it. The prior-art consensus mechanism is embodied by a method. According to the known method, normal blocks are first generated in a block DAG, which are blocks before combination. When a new transaction is generated in the system, the transaction will be collected by the nearest node and stored in the transaction pool of the node. After a node has collected enough transactions or after a certain period of time has lapsed, the node packets all the transactions in its pool and generates a new block. For a block DAG, there is not any block initially. The system has to first generate a root genesis block, which is the first block of the system, and then generate m shape genesis blocks, which act as current leaf blocks of the system. Afterward, every time a node in the system generates a new block, n leaf blocks locally at the node generating the block will be referred. Then, unacknowledged blocks in the unacknowledged block pool are sorted by the leader in the consensus protocols of the combined blockchain. This includes block layering and sorting. The entity blocks generated by the nodes are classified according to the parent blocks of the entity block. The entity blocks of the same class are combined into a logic block. All logic blocks generated in the same block time are blocks of the same layer. The logic blocks are blocks actually existing in the layered block DAG. After block layering, a layered block DAG structure is formed. The sorting is to sort the blocks in the block pool according to the hierarchical nodes of the block DAG and verify the transactions in the blocks. The logical blocks with small layer number are ordered in front, and the blocks with large layer number are ordered in back. Then the logic blocks of the same layer are sorted according to the sequence of the parent blocks in the previous layer. When the transactions are sorted, they are firstly sorted according to the sequence of the blocks where they are located. In particular, transactions in earlier blocks are at the top of the list of the sorted transactions. For transactions in the same block, they are sorted by the time points they were recorded by the node. At this time, the system gets a global sequence of all transactions and detects whether there are conflicts among the transactions. If two transactions conflict, the earlier one is kept and the later one is marked as invalid, thereby eliminating the risk of double spend attacks. Afterward, according to the sorting result, the blocks in the block sequence are combined into one or more combined blocks based on their locational relationship in the block sequence. At this time, the block pool stores therein ordered blocks. All these blocks are combined into one or more combined blocks according to certain rules. The node conducting the sorting operation, after getting the logic block, copies the combined blocks to other nodes according to consensus protocols for consensus on the combined blockchain. Then consensus is reached on the combined blockchain, so as to reach consensus on the block DAG by means of the consensus mechanism for the blockchain. The leader copies the combined blocks and provides to other follower nodes using an algorithm. In the system, every follower node when receiving the combined blocks adds the combined blocks to its local combined blockchain, thereby reaching consensus on the combined blockchain. At last, each of the nodes uses a block-splitting algorithm to split the combined block it receives, so as to obtain the original entity block, and adds the entity block into its local block DAG according to the parent block field of each of the blocks.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

While many developments and improvements have recently been made to graphic blockchains, the related consensus methods are still far from perfect in terms of efficiency, security, and consensus formation speed. In view of this, the present invention provides a hybrid consensus method for graphic blockchain. The method provides not only fast confirmation of graphic blockchains, but also the total order of all transactions. The hybrid consensus method is similar to representative democracy in the real world. The basic concept is about first selecting a few participants among all blockchain participant to form a committee, and then having the committee reach consensus on contents in the blockchain. However, the existing hybrid consensus method are designed for link-type blockchains and is not applicable to graphic blockchains. Additionally, the consensus efficiency of the committee tends to become where the performance bottleneck of the whole system lies in. To address this problem, the present invention provides a hybrid consensus method for a graphic blockchain for electing a committee in the graphic blockchain securely and fairly and for reaching consensus on the graphic blockchain within the committee. Additionally, with the hybrid consensus method of the present invention, the committee needs just reaching consensus on a few blocks to reach indirect consensus on all blocks in virtue of the topological relationship of the graphic blockchain. This configuration significantly unburdens the committee in terms of consensus and eliminates performance bottleneck of the system.

To achieve the above-mentioned objectives, the present invention provides an implementation method for graphic-blockchain-orientated hybrid consensus, at least comprising: calling at least one module to generate a new data block and broadcast the new block; calling at least one module to check and validate the received new block based on predetermined rules; calling at least one module to generate a void block; and calling at least one module to update a committee member list. Modules can be called by blockchain participants or a central processor.

According to a preferred embodiment, the new data block is generated through: storing data to be written into a blockchain to a constructed data structure; and generating a valid data block through competition.

According to a preferred embodiment, the predetermined rules for checking and validating the new block at least comprise: having a blockchain participant receiving the new block determine whether the new block has been received before; and checking validity of the new block if a determining result is negative.

According to a preferred embodiment, the predetermined rules for checking and validating the new block further comprise: checking whether a proof field of the new block is valid; and checking whether data stored in a body of the new block are valid.

According to a preferred embodiment, the predetermined rules for checking and validating the new block further comprise: checking a data structure of the received new block; and if the new block is a void block, calling at least one module to sort all blocks in a graphic blockchain.

According to a preferred embodiment, further comprising determining whether the committee members have to be updated according to a local copy of the blockchain.

According to a preferred embodiment, further comprising: having the blockchain participant regularly check whether itself is a committee member; and if a checking result is positive, regularly generating a new void block by means of voting.

According to a preferred embodiment, when the new data block is constructed, a proof field proving that the participant creating the data block wins in resource competition is void by default.

According to a preferred embodiment, when the new void block is constructed, a proof field proving that the void block receives approval from enough participants is void by default.

The disclosure further provides an implementation apparatus for graphic-blockchain-orientated hybrid consensus, the apparatus at least comprising: a committee generating module, being configured to select a part of blockchain participants to form a committee; a void block generating module, being configured to make committee members regularly vote to generate new void blocks; and a block validating module, being configured to, when receiving a new block, check and validate the received new block according to predetermined rules.

The disclosure further provides an implementation system for graphic-blockchain-orientated hybrid consensus, the system at least comprising: a data structure constructing module, being configured to construct data structure required by implementation of hybrid consensus; a data block generating module, being configured to generate new data blocks by selecting winners through competition; a committee generating module, being configured to select a part of blockchain participants to form a committee; a void block generating module, being configured to make committee members regularly vote to generate new void blocks; a block validating module, being configured to, when receiving a new block, check and validate the received new block according to predetermined rules; and a local sorting module, being configured to make every blockchain participant sort all data blocks in its local graphic blockchain according to preset rules.

The system operates through at least the following steps. First, the data structure constructing module packets the user transactions it receives into a template block and sends the template block to the data block generating module. Then the data block generating module generates a complete data block according to corresponding rules (such as using the proof of work) and broadcasts the data block. Any blockchain participant, when receiving the new block from the network, calls the block validating module to validate it for validity. If the validation succeeds, the new block is added into the graphic blockchain stored locally. Every blockchain participant regularly calls the committee generating module to check the current committee member list. A participant listed in the committee operates the void block generating module. This module allows the committee members to generate new void blocks through vote on a regular basis and broadcast them. Every void block refers plural blocks in the graphic blockchain. Every blockchain participant, when receiving a void block, calls the block validating module to validate its validity. If the validation succeeds, all the blocks directly or indirectly referred by the void block are set as confirmed blocks.

As compared to the prior art, the present invention provides at least one of the following beneficial effects:
(1) The existing graphic blockchain can only achieve probabilistic consensus, yet the hybrid consensus algorithm disclosed in the present invention achieves deterministic consensus on graphic blockchain for the first time, so that consensus on a graphic blockchain can be reached faster.
(2) The present invention decouples generation and consensus of blocks for the first time, so that the two parts can be designed separately in a modularized manner.
(3) The consensus algorithm used in the present invention can establish the total order relationship among blocks, and thereby supports applications like smart contracts. This is unachievable to many existing consensus algorithms for graphic blockchains (e.g., IOTA).
(4) The present invention provides the first totally decentralized hybrid consensus algorithm in the graphic blockchain technology. This is unachievable to many existing graphic blockchain structures (such as IOTA and Obyte).

DETAILED DESCRIPTION OF THE INVENTION

The present invention will be further detailed below with reference to accompanying drawings and details of the invention for further explaining its objectives, technical schemes and advantages. It is to be understood that the embodiments as described herein are only illustrative but not limiting.

For ease of understanding, technical terms of the present invention are explained as follows.

A blockchain participant is a computer joining the blockchain network, storing a copy of the blockchain locally, and running blockchain consensus protocols.

A block creator is a blockchain participant who creates blocks. Every blockchain participant locally generates a pair of keys required by the asymmetric encryption algorithm, wherein the public key is open and used as the identifier of the participant, while the private key is kept secretly by the participant. Every participant, when creating a new block, uses the private key to sign the block, and other participants use the open, public key to identify the creator of the block.

References can be made as direct references or indirect references. If Block 2 is the parent block of Block 1, we can say that Block 1 refers Block 2 directly. If Block 3 is the parent block of Block 2, we can say the Block 1 indirectly refers Block 3 through Block 2. More indirect references may be established according to this rule.

Probabilistic consensus refers to consensus that, after reached, may be reversed in some probability, wherein the probability exponentially decreases over time.

Deterministic consensus refers to consensus that, after reached, can never be reversed. This is usually realized using a BFT (Byzantine Fault Tolerance) algorithm.

A partial order, in the context of blockchains, is established when there is not clear precedence relationship between two transactions.

A total order, in the context of blockchains, is established when there is clear precedence relationship between two transactions. A total order is not necessary for applications in which the execution sequence does not affect results, such as digital payment, but is necessary for applications in which the execution sequence affects results, such as auctions and smart contracts.

A consensus mechanism is a way to complete validation and confirmation of a transaction in a very short period of time through vote of special nodes. If several nodes irrelevant mutually in terms of interest can reach consensus on a transaction, it is recognized that the whole network has consensus on the transaction. As a data structure storing data chronologically, a blockchain supports different consensus mechanisms. A consensus mechanism is an important component in the blockchain technology. The purpose of a blockchain consensus mechanism is to make all honest nodes keep consistent view on a blockchain with two aspects both satisfied. The first one is consistency, which means the prefixes of the blockchain kept by all honest nodes are identical. The second one is validity, which means information published by an honest node will eventually be recorded by other all honest nodes in their respective blockchains. The common consensus mechanisms include: POW (Proof of Work), POS (Proof of Stake), POW+POS (a hybrid consensus mechanism), DPOS (Delegated Proof of Stake), Pool (the validation pool), the Ripple consensus protocols, PBFT (Practical Byzantine Fault Tolerance) algorithm, etc.

Scalability of a consensus mechanism refers to variations in system load and in network traffic caused by increase of the number of members and the number of transactions to be conformed in a system, which is usually measured by network throughput.

The PoW (Proof of Work) mechanism works as described below. In order to make transaction data recorded on a blockchain and have consensus reached thereon in a certain period of time, the PoW mechanism is to have all network node participants of the blockchain compete for the accounting right. This means that if a node wants to generate a new block and write the block into the blockchain, it has to answer the PoW puzzle set by the Bitcoin network, and the node answering first wins the right to do accounting. Then the winning node can start to keep account and broadcasts its answer to the puzzle and transaction records to other nodes for validation. Afterward, the node can start a new round of mining. If transactions in a block are acknowledged by other node participants as valid and the answer to the puzzle is correct, the answer is trusted, so the new node will be written into the blockchains of the validators. At the same time, the validators enter a new round of competition. Satoshi Nakamoto used the secure Hash algorithm to design a mathematic puzzle as a double SHA256 hash operation to block head information. The PoW consensus algorithm comprises: 1. having all nodes receive and forward transaction information, packet the received transaction information into a new block, then having all nodes set the Nonce field in the block head according to the new block packeted by this node, compute the Hash value of the whole block head information and make it match a target value, wherein the node being the first to complete computation acts as the leader and broadcasts its block to the other nodes; 2. making nodes losing in competition, after receiving the new block, give up their computation for a new local block, and validate the received new block; and 3. having the nodes, after validating the new block as valid, add it to their respective local blockchains, thereby all nodes reach consensus on the block at the latest height.

The PoS (Proof of Stake) mechanism is an improved consensus mechanism designed to address the shortcomings of the POW mechanism. The PoS mechanism adopts the competition concept of PoW algorithms, with the difference lying in that, opposite to the PoW algorithm requiring a large search space for the Nonce field, the PoS mechanism limits the search space to a computationally acceptable range. Different from the Proof of Work mechanism that requires nodes to perform Hash compute continuously to validate validity of transactions, the PoS mechanism is based on the principle that it requires a user to prove itself possesses ownership of a certain amount of a digital currency, namely the "stake". What makes the PoS mechanism truly distinctive from the PoW mechanism is that only people holding the digital currency can do mining, and money can be mined without huge computing power. This helps mitigate the trendy of "computing power concentration" as seen in Bitcoin networks and allows blockchains to recover the essential requirement of "decentralization".

The PBFT (Practical Byzantine Fault Tolerance) algorithm is the basis of the consensus algorithm for Commercial Union Coins. PBFT addresses the Byzantine Problem in the case of a finite number of nodes, and has a tolerance of 3f+1, while ensuring a certain level of performance. PBFT reduces the complexity of the Byzantine protocols from the exponential order to the polynomial order, so as to make it possible to use the Byzantine protocols in distributed systems.

Copies refers to transcripts of the same data distributed across different computers. In the disclosure, a copy is a blockchain stored by a blockchain participant locally. Differences may exist between local copies kept by different blockchain participants due to network transmission delay or other reasons.

An IOTA (Internet of Things Application) is a public, distributed ledger based on the Internet of things (IoT). Its basis is a tangle, not a blockchain. A tangle is a new data structure based on a directed acyclic graph (DAG) created especially for the IOTA protocols, but not a continuous, link-like structure. Through a DAG, an IOTA can achieve higher transaction throughput (by means of parallel validation), and no transaction handling fees are charged. In a tangle, every node represents a transaction. The responsibility for validating transactions throughout the network is transferred to every user of the network from the miners. When a blockchain participant wants to initiate a transaction, it has to help validate other transactions in the network.

A transaction may be regarded as a set of request data sent to a blockchain system, and is used for deploying contracts, calling contract interface, maintaining contract lifecycle, managing assets, and performing value exchange. A transaction has a basic data structure comprising senders, receivers, and transaction data. A user may construct a transaction, sign the transaction with its own private key, and send the transaction to the chain (through interface such as sendRawTransaction). The transaction is then subject to the consensus mechanism among multiple nodes. Afterward, the codes of related smart contracts are executed and designated state data of the transaction are generated. The transaction is packeted into a block, traded and stored together with the state data. At this time, the transaction is confirmed. A confirmed transaction is recognized as having transactional properties and consistency.

The present application provides an implementation apparatus for graphic-blockchain-orientated hybrid consensus, which at least comprises at least one of the following modules: a data structure constructing module, a data block generating module, a committee generating module, a void block generating module, a block validating module, and a local sorting module. The hybrid consensus implementation apparatus of the present invention may be, for example, a computer, a server, or another device or system using the hybrid consensus implementation apparatus. According to embodiments of the present invention, besides the data structure constructing module, the data block generating module, the committee generating module, the void block generating module, the block validating module, and the local sorting module, the hybrid consensus implementation apparatus may further comprise other components, such as a central processor, a communication unit, a storage unit or an I/O unit. Preferably, a blockchain participant referred in the disclosure can be a central processor of the hybrid consensus implementation apparatus. For example, the blockchain participant regularly checks whether itself is a committee member so as to determine whether it needs to participate in committee consensus. That is to say, the central processor regularly checks whether its corresponding blockchain participant, its respective node or even itself is a committee member so as to determine whether it needs to participate in committee consensus. For example, the data structure constructing module, the data block generating module, the committee generating module, the void block generating module, the block validating module, and the local sorting module are connected with the central processor, respectively, and all perform information exchange with it.

As examples, a general-purpose processor, a digital signal processor (DSP), an application specific integrated circuit (ASIC), a field programmable gate array (FPGA) or another programmable logic device, a discrete gate or transistor logic, a discrete hardware component and/or any combination for executing the disclosed functions may be used to realize or implement the various exemplary logic blocks, modules, and circuits as described herein. The general-purpose processor may be a micro-processor. Alternatively, the processor may be any ordinary processor, controller, micro-controller or state machine. The processor may alternatively be realized as a combination of computing equipment, such as a combination of DSP and a micro-processor, a combination of plural micro-processors, a combination of one or plural micro-processors and a DSP kernel, or any other similar structure. As examples, the disclosed embodiment may be described in the context of a machine-executable instruction. The machine-executable instruction may be incorporated in a program module operating in a device on the actual or virtual target processor. Generally speaking, the program module may include a routine, a program, a library, an object, a class, a component, a data structure, etc., and is for executing particular tasks or realizing particular abstract data structures. In individual embodiments, functions of the program module may be merged or divided among the described program modules. The machine-executable instruction used in the program module may be executed locally or in distributed equipment. In the distributed equipment, the program module may be located both locally and in a remote storage medium.

Figure 2:
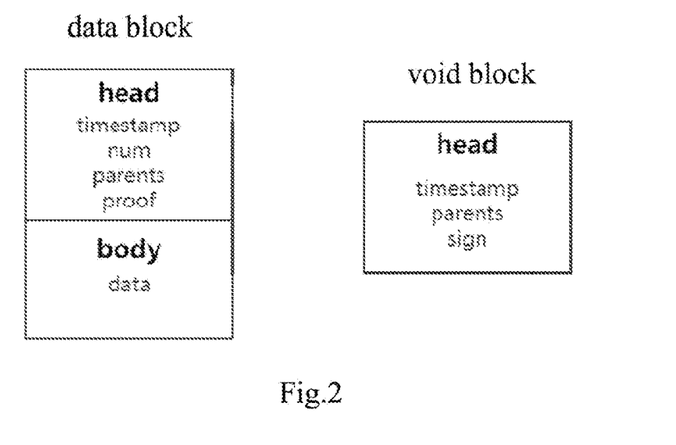
FIG. 2 schematically shows main data structures used by the hybrid consensus implementation apparatus according to the present invention.

The data structure constructing module is used to construct at least one data structure required by implementation of hybrid consensus. The data structures constructed by the data structure constructing module at least comprises data blocks and void blocks. As shown in FIG. 2, a data block has two pats, namely a body and a head. The body stores transactions (data). The head contains meta data used to construct the graphic blockchain. The head is used to construct the graphic blockchain.

Preferably, the body may be configured to store only one transaction. Under this configuration, all data blocks are created by the clients themselves, similar to IOTA. Preferably, the body may be configured to store a transaction list. Under this configuration, a miner is in place of a client to packet transaction, similar to the traditional blockchain.

The head of a data block contains some important fields, at least including one or more of the fields for the timestamp (Timestamp), the number of data entries contained in the body (Num), the unique identifier list of all parent blocks (Parents), and the proof proving that the participant creating the data block has won the resource competition (Proof). When the data structure constructing module constructs a new data block, the proof field for proving that the participant creating the data block has won resource competition is void by default. The data block mainly serves to stores data of the upper-layer application in its body field. For example, in a digital payment system, the field is used to store transaction records.

As shown in FIG. 2, a void block does not store data, but only contains a head portion. The head of a void block contains some important fields, at least including one or more fields for the timestamp (Timestamp), the unique identifier list of all parent blocks (Parents), the proof proving that the void block receives approval from enough participants (Sign). When the data structure constructing module constructs a new void block, the proof field proving that the void block receives approval form enough participants is void by default. The void block is generated using the deterministic consensus algorithm, and therefore all the data blocks directly or indirectly referred by the void block receive irreversible confirmation. The upper-layer applications may use the data in these data blocks securely.

The data block generating module is configured to fairly and randomly select winners in competition for some resource to generate new data blocks. The data block generating module may use the proof of work to get new data blocks. Specifically, it makes all blockchain participants change the proof field in the data block continuously, until the abstract value of the data block meets certain requirements. Only at this time is the data block valid. Any other blockchain participant when receiving the data block will first validate validity of the proof field. The data block generating module may alternatively use the proof of stack to get the new data block.

Figure 3:
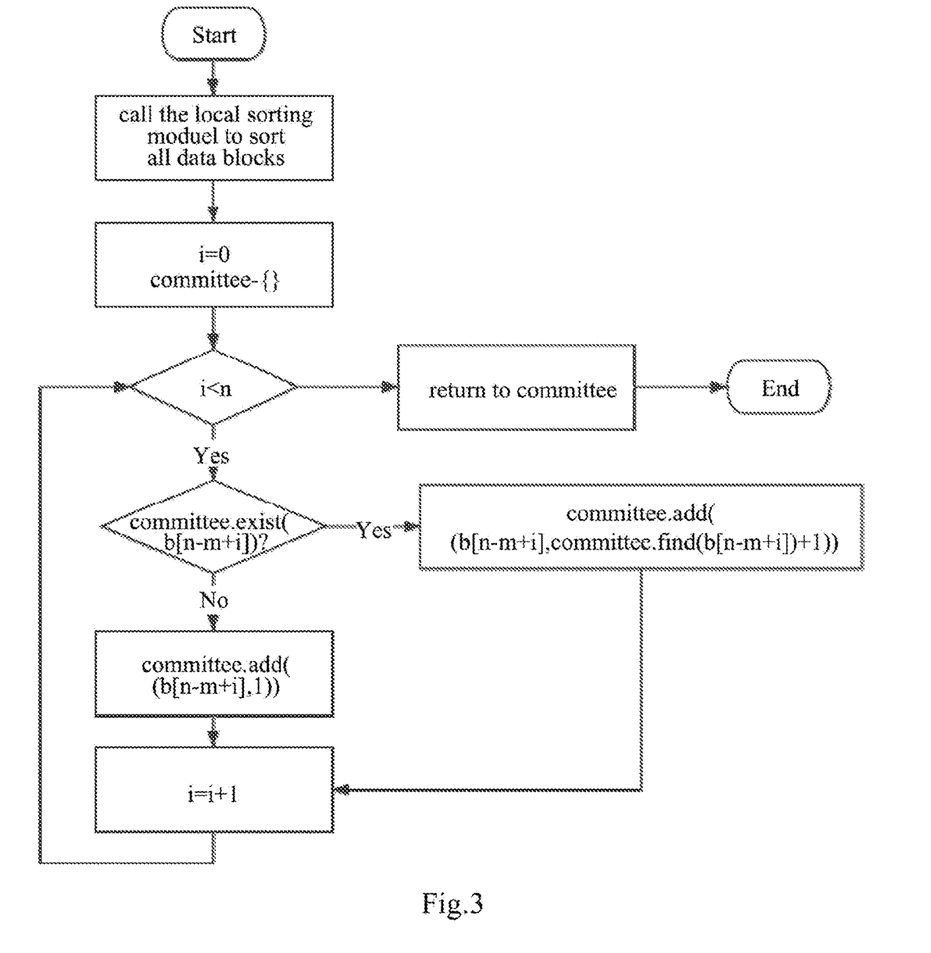
FIG. 3 is a simplified flowchart of a committee random election algorithm according to the present invention.

The committee generating module is configured to fairly and randomly select at least one blockchain participant to form the committee. When the committee generating module is called, it selects n blockchain participants to form the committee. The committee generating module has to randomly selects a few blockchain participants to form the committee. FIG. 3 schematically shows the process of the committee random selection algorithm. Specifically, every blockchain participant, after calling the local sorting module to sort all data blocks in the graphic blockchain, targets the latest n blocks according to the chronological order of the data blocks, and selects creators of these n data blocks as members of the committee. Preferably, if the creator of m (m>1) blocks is the same blockchain participant, the blockchain participant is recognized as controlling m votes in subsequent vote.

The void block generating module is configured to make the committee members regularly generate new void blocks through vote and confirm and sort data blocks. Particularly, vote may be realized using the Byzantine Fault Tolerance protocols, such as PBFT. Any valid void block requires approval from at least two thirds of the committee members. Since most Byzantine Fault Tolerance protocols need to set a leader, such a leader may be played by the data blocks by turns in a chronological order of them.

The block validating module is such configured that when receiving a new block, it validates whether the block is valid according to preset rules. The preset rules for the block validating module to validate whether the block is valid include: validating whether all ancestor blocks of this block are known; validating the block for validity; and checking data stored in the body according to practical application needs.

Preferably, when the new block received by the block validating module is a data block, it is to check whether the new block satisfies requirements for resources competition. The requirements for resources competition may refer, for example, that the abstract value of the block satisfies requirements.

Preferably, if the new block received by the block validating module is a data block, data in the body are checked for validity according to the application logic in the upper layer. This is achieved by, for example, checking whether the transaction was created by a correct user according to the signature and checking whether the transaction meets requirements for the upper-layer applications.

Preferably, when the new block received by the block validating module is a void block, it is to check whether the new block receives approval from at least two thirds of the committee members. This may be achieved using the multi-signature scheme.

The local sorting module is configured to make every blockchain participant sort all data blocks in its local graphic blockchain according to preset rules. The local sorting module ensures that all blockchain participants have the same sorting results for all blocks.

Figure 4:
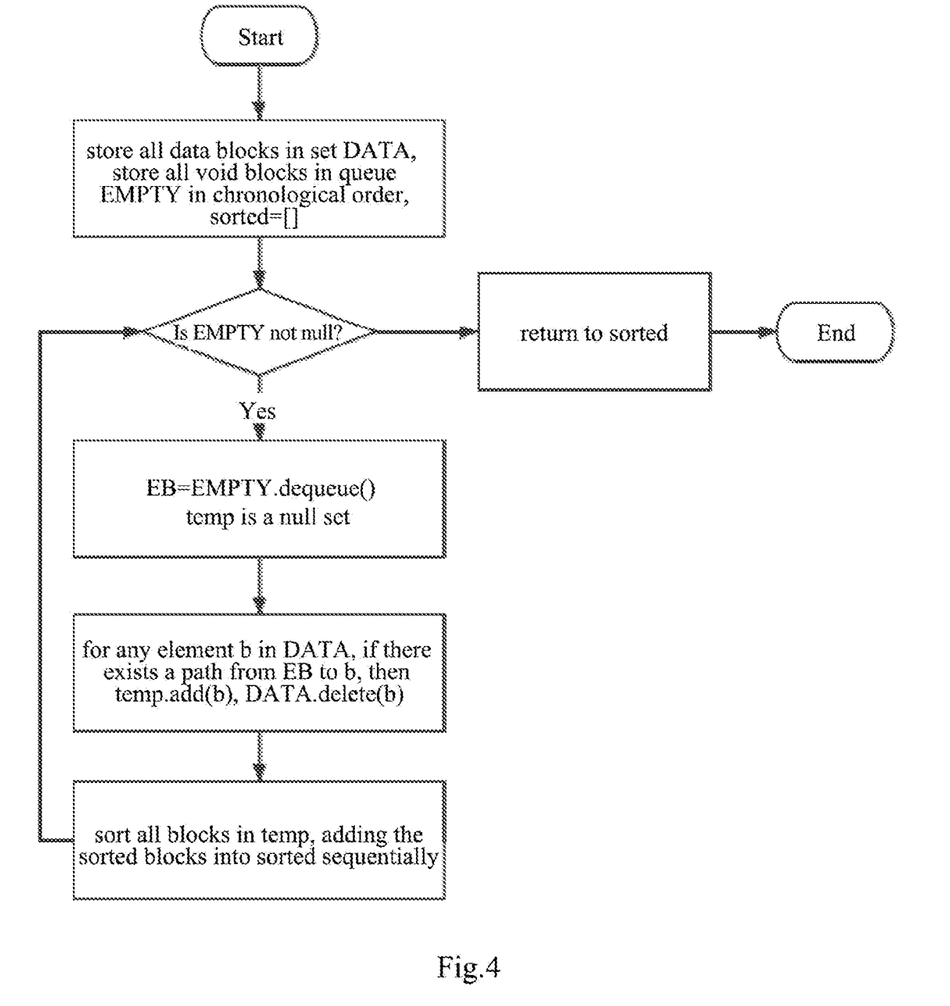
FIG. 4 is a simplified flowchart of a local sorting algorithm according to the present invention.

As shown in FIG. 4, the local sorting module is configured to first sort all void blocks in a chronological order. Every void block logically means a round. Subsequently, the local sorting module assigns all the data blocks to different rounds according to the reference relationship between the void block and data blocks. For data blocks of different rounds, they are sorted according to the sequences of the rounds they belong to. For data blocks of the same round, they are sorted according to their abstract values.

If the void block $E_i$ is a void block that is the first one to directly or indirectly refer the data block $D_j$, the local sorting module assigns the data block $D_j$ to the round to which the void block $E_i$ belongs.

When the local sorting module assigns the data block $D_j$ to the void block $E_i$, the data block $D_j$ now is a sorted block.

If it is impossible to assign the data block Ds to any void block, the local sorting module regards the data block Ds as an unsorted block.

The local sorting module then sorts all sorted data blocks. Preferably, the local sorting module sorts all sorted data blocks according the order of the void blocks to which the data blocks belong. Preferably, for data blocks belonging to the same void block, the local sorting module sorts them according to their abstract values.

Figure 1:
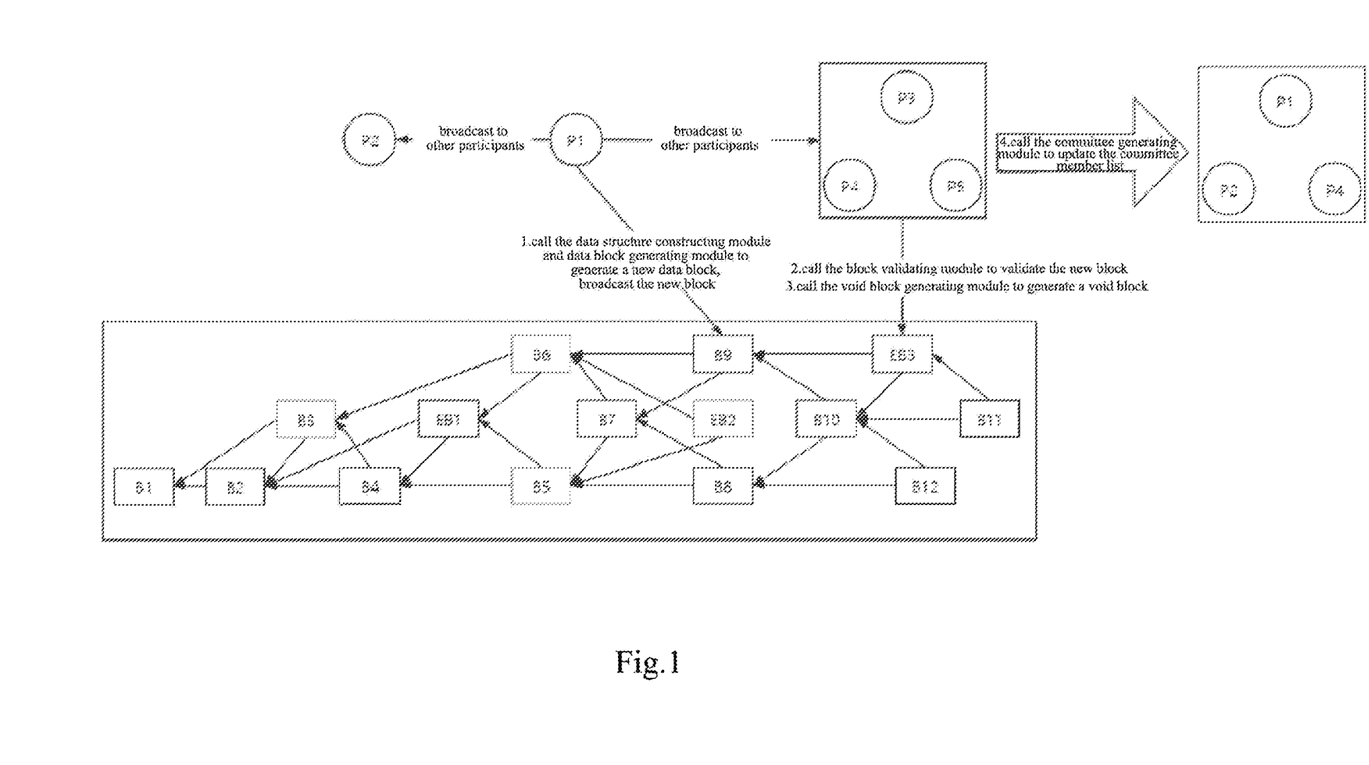
FIG. 1 schematically shows general framework of a hybrid consensus implementation apparatus according to the present invention.

As shown in FIG. 1, the present invention provides an implementation method for graphic-blockchain-orientated hybrid consensus, at least comprising steps S1 to S5. While the steps of the hybrid consensus implementation method are herein described in a specific sequence, this shall not be construed as that the exact operations have to be performed in the described sequence or performed successively to obtain the expected results. In some cases, multi-tasking or parallel processing may be advantageous. Similarly, the detailed implementation included in the discussion given above shall not be interpreted as limitations to the scope of the present invention or of the claims. Instead, they are only description for some particular embodiments of the discussed invention. In the disclosure, some features separately described with respect to the context of different embodiments may be integrally implemented in a single embodiment. On the contrary, features described with respect to the context of a single embodiment may be alternatively implemented in multiple embodiments or any suitable sub-combination of these embodiments separately.

In FIG. 1, $P_i$ (i=1 to 5) each denotes a different blockchain participant, $B_j$ (=1 to 12) each denotes a different data block, and $EB_a$ (a=1 to 3) each denotes a different void block. Therein, $EB_1$ means the first void block, and corresponds to the first round. Since $EB_1$ directly or indirectly refers $B_1B_2B_4$, $B_1B_2B_4$ are assigned to the first round. $EB_2$ is the second void block, and corresponds to the second round. $B_3B_5B_6$ are assigned to the second round (although $B_1B_2B_4$ are also referred indirectly by $EB_2$, $B_1B_2B_4$ have been assigned to the first round). Similarly, $EB_3$ is the third void block, and corresponds to the third round. $B_7B_8B_9B_{10}$ are assigned to the third round. $B_{11}B_{12}$ are not referred by any void block, so they are unsorted blocks.

At S1, some blockchain participant calls the data structure constructing module to construct a data block. In the block, the body field stores received user transactions, and the proof field is void. Then the generated data block is delivered to the data block generating module, which fills valid proof field for the data block based on certain rules, thereby generating a complete data block. Taking a PoW for example, the data block generating module will change the value of the proof field continuously until the abstract value of the data block is smaller than a preset difficulty value. The complete data block is broadcasted to the network.

When a blockchain participant receives a new block, it executes the step S2.

At S2, a blockchain participant receiving the new block determines whether this block has been received before. If the blockchain participant has received the new block before, it takes no action. Otherwise, it calls the block validating module to check the new block for validity.

The step of checking the new block for validity at least comprises: determining whether all ancestor blocks of the new block have been received locally; and if not all ancestor blocks of the new block have been received locally, leaving the new block aside temporarily, until all ancestor blocks of the new block have been received.

The step of checking the new block for validity further comprises: checking whether the proof field of the new block is valid according to certain rules; checking whether data stored in the body of the new block are valid according to particular application needs; and if any check fails, the block is discarded and the processing ends.

After validity is checked, the step S3 is executed.

At S3, every time a new block is received, the new block is identified as a data block or a void block according to its data structure (whether the block contains a body field). Blocks of different types will be processed differently. If the new block is a data block, no action will be taken. If the new block is a void block, the local sorting module is called to sort all blocks in the graphic blockchain.

At S4, a blockchain participant regularly calls the committee generating module to determine, according to the local copy of the blockchain, whether committee members have to be updated. For example, the committee generating module may be configured to be called every time n void blocks have been added into the blockchain. Then the committee member list will be updated, if the determination confirms so. Otherwise, no action will be taken.

At S5, a blockchain participant regularly checks whether itself is a committee member so as to determine whether it needs to participate in committee consensus. If a blockchain participant finds that it is not a committee member, no action will be taken. Otherwise, it joins the process of committee consensus, and helps accomplish proposition and vote of the new void block by calling the void block generating module. Every void block refers plural data blocks. The void block approved in the vote will be broadcasted to the network. When other blockchain participants receive the void block, they will sort and confirm the data blocks according to the reference relationship between the void block and the data blocks.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. An implementation method for graphic-blockchain-orientated hybrid consensus, the method at least comprising:
    calling at least one module to generate a new data block and broadcast the new block;
    calling at least one module to check and validate the received new block based on predetermined rules;
    calling at least one module to generate a void block, wherein the void block is generated by a deterministic consensus algorithm;
    and calling at least one module to update a committee member list;
    and calling at least one module to sort all void blocks in a chronological order, wherein every void block logically is a round, and
    further wherein the module assigns all the data blocks according to a reference relationship between the void block and the data blocks,
    wherein data blocks of different rounds are sorted according to the sequences of the rounds they belong to, and data blocks of the same round are sorted according to their abstract values,
    wherein the new data block is generated through:
    storing data to be written into a blockchain to a constructed data structure; and generating a valid data block through competition,
    wherein the predetermined rules for checking and validating the new block at least comprise:
    having a blockchain participant receiving the new block determine whether the new block has been received before; and checking validity of the new block if a determining result is negative,
    wherein the predetermined rules for checking and validating the new block further comprise:
    checking whether a proof field of the new block is valid; and checking whether data stored in a body of the new block are valid,
    wherein the predetermined rules for checking and validating the new block further comprise:
    checking a data structure of the received new block; and if the new block is a void block, calling at least one module to sort all blocks in a graphic blockchain.

2. The implementation method for hybrid consensus of claim 1, further comprising determining whether committee members have to be updated according to a local copy of the blockchain.

3. The implementation method for hybrid consensus of claim 2, further comprising:
    having the blockchain participant regularly check whether itself is a committee member; and
    if a checking result is positive, regularly generating a new void block by means of voting.

4. The implementation method for hybrid consensus of claim 3, wherein when the new data block is constructed, a proof field proving that the participant creating the data block wins in resource competition is void by default.

5. The implementation method for hybrid consensus of claim 4, wherein when the new void block is constructed, a proof field proving that the void block receives approval from enough participants is void by default.

6. An implementation apparatus for graphic-blockchain-orientated hybrid consensus, the apparatus at least comprising:
    a committee generating module, being configured to select a part of blockchain participants to form a committee;
    a void block generating module, being configured to make committee members regularly vote to generate new void blocks; and
    a block validating module, being configured to, when receiving a new block, check and validate the received new block according to predetermined rules,
    wherein data blocks of different rounds are sorted according to the sequences of the rounds they belong to, and data blocks of the same round are sorted according to their abstract values,
    wherein the new data block is generated through:
    storing data to be written into a blockchain to a constructed data structure; and generating a valid data block through competition,
    wherein the predetermined rules for checking and validating the new block at least comprise:
    having a blockchain participant receiving the new block determine whether the new block has been received before; and
    checking validity of the new block if a determining result is negative,
    wherein the predetermined rules for checking and validating the new block further comprise:
    checking whether a proof field of the new block is valid; and checking whether data stored in a body of the new block are valid,
    wherein the predetermined rules for checking and validating the new block further comprise:
    checking a data structure of the received new block; and if the new block is a void block, calling at least one module to sort all blocks in a graphic blockchain.

7. The implementation apparatus for graphic-blockchain-orientated hybrid consensus of claim 6, wherein the apparatus is further configured to determine whether committee members have to be updated according to a local copy of the blockchain.

8. The implementation apparatus for graphic-blockchain-orientated hybrid consensus of claim 7, wherein the apparatus is further configured to have the blockchain participant regularly check whether itself is a committee member; and
    if a checking result is positive, regularly generate a new void block by means of voting.

9. The implementation apparatus for graphic-blockchain-orientated hybrid consensus of claim 8, wherein when the new data block is constructed, a proof field proving that the participant creating the data block wins in resource competition is void by default.

10. The implementation apparatus for graphic-blockchain-orientated hybrid consensus of claim 9, wherein when the new void block is constructed, a proof field proving that the void block receives approval from enough participants is void by default.

11. An implementation system for graphic-blockchain-orientated hybrid consensus, the system at least comprising:
a data structure constructing module, being configured to construct data structure required by implementation of hybrid consensus;
a data block generating module, being configured to generate new data blocks by selecting winners through competition;
a committee generating module, being configured to select a part of blockchain participants to form a committee;
a void block generating module, being configured to make committee members regularly vote to generate new void blocks;
a block validating module, being configured to, when receiving a new block, check and validate the received new block according to predetermined rules; and
a local sorting module, being configured to make every blockchain participant sort all data blocks in its local graphic blockchain according to preset rules,
wherein data blocks of different rounds are sorted according to the sequences of the rounds they belong to, and data blocks of the same round are sorted according to their abstract values,
wherein the new data block is generated through:
storing data to be written into a blockchain to a constructed data structure; and generating a valid data block through competition,
wherein the predetermined rules for checking and validating the new block at least comprise:
having a blockchain participant receiving the new block determine whether the new block has been received before; and checking validity of the new block if a determining result is negative,
wherein the predetermined rules for checking and validating the new block further comprise:
checking whether a proof field of the new block is valid; and checking whether data stored in a body of the new block are valid,
wherein the predetermined rules for checking and validating the new block further comprise:
checking a data structure of the received new block; and if the new block is a void block, calling at least one module to sort all blocks in a graphic blockchain.

12. The implementation system for graphic-blockchain-orientated hybrid consensus of claim 11, wherein the system operates through at least the following steps:
the data structure constructing module packets the user transactions it receives into a template block and sends the template block to the data block generating module;
the data block generating module generates a complete data block according to corresponding rules, preferably by using the proof of work, and broadcasts the data block;
any blockchain participant, when receiving the new block from the network, calls the block validating module to validate it for validity;
if the validation succeeds, the new block is added into the graphic blockchain stored locally;
every blockchain participant regularly calls the committee generating module to check the current committee member list;
a participant listed in the committee operates the void block generating module, wherein this module allows the committee members to generate new void blocks through vote on a regular basis and broadcast them, every void block refers plural blocks in the graphic blockchain, every blockchain participant, when receiving a void block, calls the block validating module to validate its validity, if the validation succeeds, all the blocks directly or indirectly referred by the void block are set as confirmed blocks.

* * * * *